United States Patent [19]
Davis

[11] 3,895,080
[45] July 15, 1975

[54] SEPARATION OF CYCLIC COMPOUNDS BY ADSORPTION ON PARTIALLY SORBED METALLIC ZEOLITES

[75] Inventor: Ronald I. Davis, Wilmington, Del.

[73] Assignee: Sun Research and Development Company, Marcus Hook, Pa.

[22] Filed: May 1, 1973

[21] Appl. No.: 356,265

Related U.S. Application Data

[63] Continuation-in-part of Ser. No. 263,370, June 6, 1972, Pat. No. 3,793,386.

[52] U.S. Cl. ...... 260/674 SA; 208/310; 260/666 P; 260/675
[51] Int. Cl. .............................................. C07c 7/12
[58] Field of Search ......... 260/674 SA, 675, 666 P; 208/310

[56] References Cited
UNITED STATES PATENTS

| | | | |
|---|---|---|---|
| 3,070,542 | 12/1962 | Asher et al. | 260/674 |
| 3,133,126 | 5/1964 | Fleck et al. | 260/674 |
| 3,306,848 | 2/1967 | Wackher et al. | 208/310 |
| 3,662,014 | 5/1972 | Avirllon et al. | 260/674 |
| 3,668,266 | 6/1972 | Chen et al. | 260/674 |
| 3,668,267 | 6/1972 | Hedge | 260/674 |
| 3,686,343 | 8/1972 | Bearden et al. | 260/674 |
| 3,699,182 | 10/1972 | Cattanach | 260/674 |
| 3,734,974 | 5/1973 | Neuzil | 260/674 |

*Primary Examiner*—Delbert E. Gantz
*Assistant Examiner*—C. E. Spresser
*Attorney, Agent, or Firm*—George L. Church; J. Edward Hess; Barry A. Bisson

[57] ABSTRACT

Selective adsorption of cyclic hydrocarbons (e.g., p-xylene, 2,6-dimethylnaphthalene) from a fluid mixture containing other structurally similar hydrocarbons (e.g., m-xylene, 2,7-dimethylnaphthalene) can be obtained with metallic molecular sieves (crystalline alumino-silicate zeolites) which contain a controlled amount of a sorbed polar ligand, preferably water and/or ammonia.

12 Claims, 2 Drawing Figures

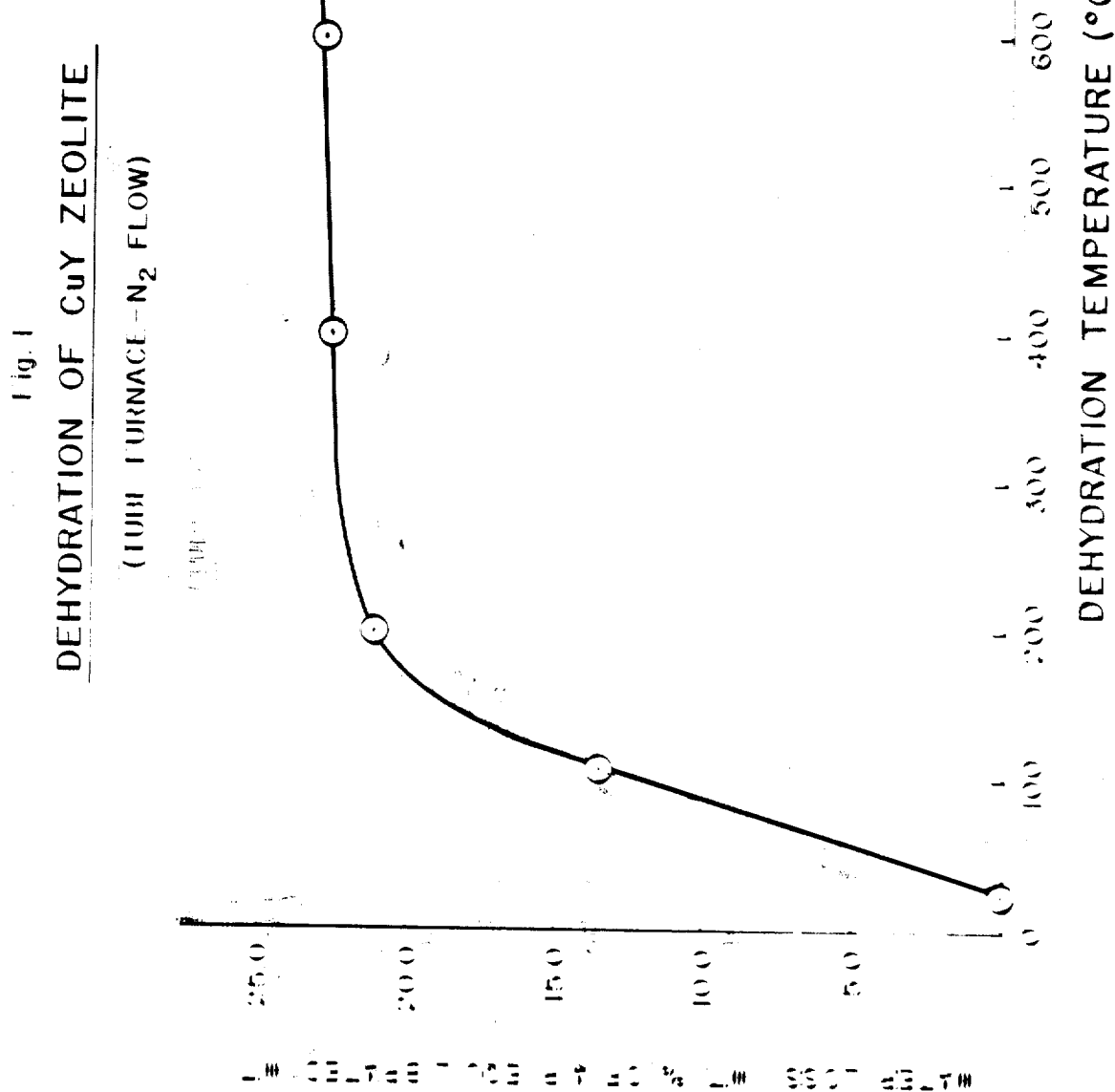

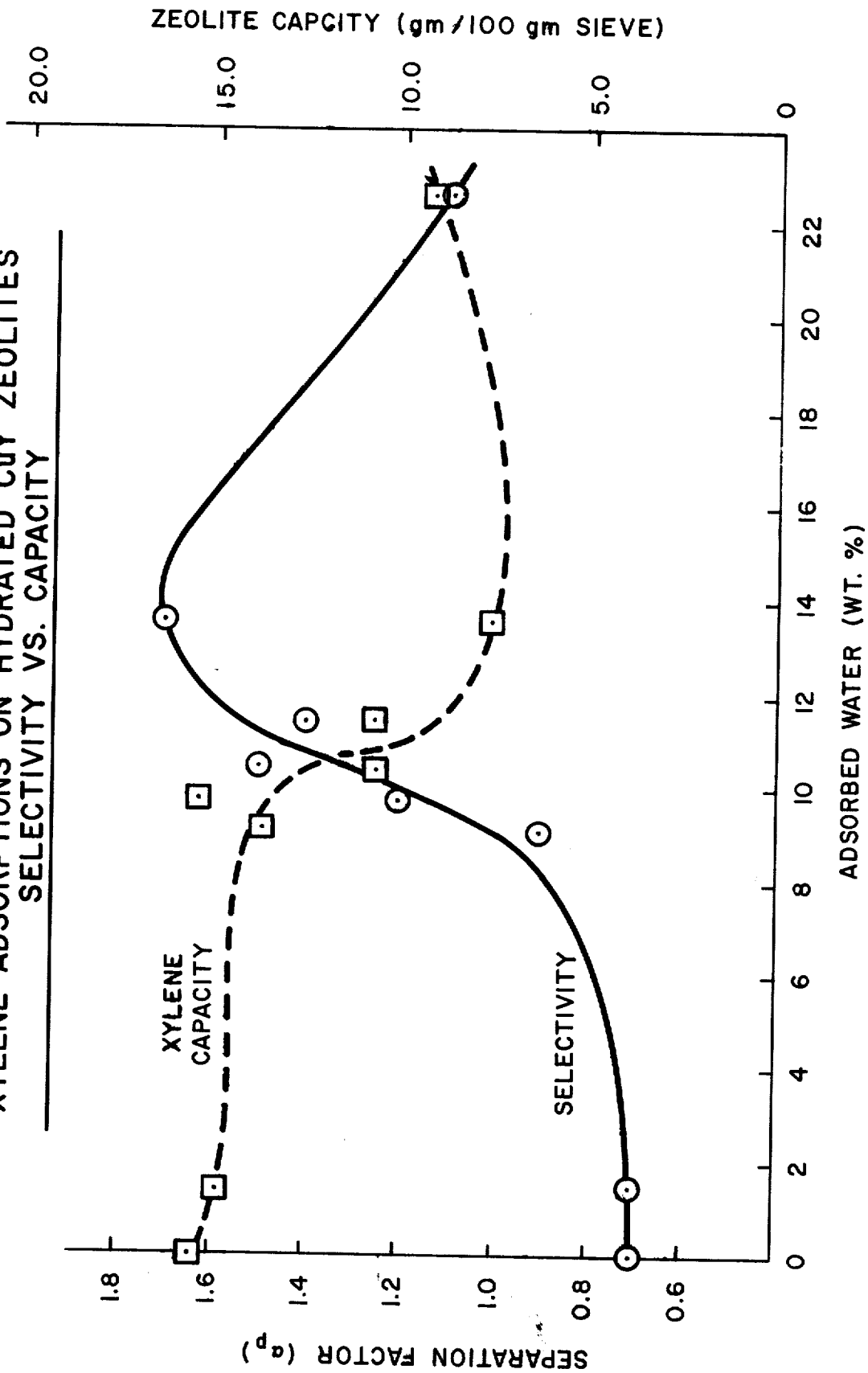

SEPARATION OF CYCLIC COMPOUNDS BY ADSORPTION ON PARTIALLY SORBED METALLIC ZEOLITES

CROSS REFERENCES TO RELATED APPLICATIONS

This application is a continuation-in-part of my application Ser. No. 263,370, filed June 6, 1972 (now U.S. Pat. No. 3,793,386 issued Feb. 19, 1974).

This application is related to the applications of John A. Hedge Ser. No. 7,273, filed Jan. 30, 1970 (patented on June 6, 1972 as U.S. Pat. No. 3,668,267); Ser. No. 207,870, filed Dec. 14, 1971 now U.S. Pat. No. 3,855,328; Ser. No. 256,863, filed May 25, 1972 now U.S. Pat. No. 3,772,399; and Ser. No. 263,372, filed June 6, 1972, now U.S. Pat. No. 3,840,610.

Other relevant applications (which show zeolites which can be used as adsorbents in the present invention and methods for partial dehydration and/or deamination thereof) are Ser. No. 716,190, filed Mar. 26, 1968 and Ser. No. 211,040, filed Dec. 22, 1971 (now U.S. Pat. No. 3,839,228 issued Oct. 1, 1974), both of Kirsch, Barmby and Potts. All of the above-referred to applications are hereby incorporated herein.

BACKGROUND OF THE INVENTION

Molecular sieves have been used to separate distinct classes of organic compounds and have also been used to separate compounds within a given class. The separation of n-paraffins from branched paraffins with 5A molecular sieves is well known. Selective adsorption of aromatics from mixed streams with 10X and 13X sieves is also known. The use of 10X molecular sieves to separate mixtures of aromatics has been disclosed in U.S. Pat. Nos. 3,114,782 issued Dec. 17, 1963 to Fleck et al. and 3,133,126 issued May 12, 1964 to Fleck et al. U.S. Pat. Nos. 3,558,732 issued Jan. 26, 1971 and 3,626,020 issued Dec. 7, 1971 to Neuzil, and U.S. Pat. No. 3,665,046 issued May 23, 1972 to DeRosset, deal with the use of Type X and Y zeolites for separation of a $C_8$ aromatic isomer (e.g., p-xylene) from mixtures of such isomers.

None of the above cited patents disclose that sorbed polar compounds (e.g., the water content of the zeolite, (which depends on the conditions of the dehydration or activation process) can be critical in determining selectivity of the adsorbent. U.S. Pat. No. 3,668,267 of Hedge does disclose such an effect of water content. However, the Hedge patent does not disclose that a controlled quantity of ammonia in a zeolite can enhance selectivity for a particular cyclic compound. Nor does the Hedge patent disclose that a copper containing zeolite containing a sorbed polar compound can be useful in such operations.

BRIEF DESCRIPTION OF THE INVENTION

Selective adsorption of cyclic hydrocarbons (e.g., p-xylene, 2,6-dimethylnaphthalene) from a fluid mixture containing other structurally similar hydrocarbons (e.g., m-xylene, 2,7-dimethylnaphthalene) can be obtained with copper exchanged molecular sieves (crystalline alumino-silicate zeolites) which contain a controlled amount of a sorbed polar ligand, preferably water or ammonia.

For example, a preferred copper zeolite has a water loss on ignition at 800°C in the range of 8–20 weight percent and preferably, has been partially dehydrated at a temperature in the range of 50°–300°C. For example, 2,7-dimethylnaphthalene can be separated from 2,6-dimethylnaphthalene by selective adsorption at 100°C of the 2,7-dimethylnaphthalene on CuY zeolite which has been partially dehydrated at 90°C and contains about 13.9 weight percent water by ignition analysis.

Similarly, various amounts of adsorbed ammonia alter the selectivity of these cation-exchanged zeolites. A CuY sieve containing 4.6 weight percent adsorbed ammonia was also quite selective for p-xylene ($\alpha p = 1.6$) and its capacity was higher (12.3 grams/100 grams sieve) than that of a partially hydrated CuY zeolite. Similar fluctuations in selectivity are observed in the case of the NiY and CoY zeolites. However, the presence of adsorbed water or ammonia in a barium exchanged potassium Y zeolite only reduced its selectivity for p-xylene.

Sodium zeolites also have good separation factors for cyclic hydrocarbons when they contain controlled amounts of ammonia.

In general, selective adsorption of one cyclic hydrocarbon from a fluid mixture with a structurally similar cyclic hydrocarbon can be obtained with molecular sieve zeolites which contain copper, cobalt, silver or nickel in exchange positions and which have been partially dehydrated at a temperature in the range of 50°–300°C and have a weight loss of water in the range of 8–20% on ignition analysis at 800°C (or higher).

The Al/Si ratio in the zeolite framework can be in the range of 0.1–1.0; more preferred 0.2–0.65 (e.g., Linde Type Y).

The invention includes a process for separating p-xylene from m-xylene comprising contacting a fluid feed mixture containing said xylene with a solid adsorbent comprising a partially sorbed, substantially crystalline alumino-silicate zeolite. For example, the zeolite can have a weight loss of water in the range of 8–20% on ignition analysis at 800°C and a critical pore diameter greater than about 6A, the ratio Al/Si of the alumino-silicate framework of the zeolite being in the range of 0.2–1.0 (more preferred 0.2–0.65), whereby there is obtained an adsorbent containing an adsorbate which is richer in one said xylene than was said fluid feed mixture, and a raffinate product which contains less of the one said xylene than did said fluid feed mixture (and wherein at least 15% of the cation exchange capacity of said zeolite is satisfied by cations of copper); separating said raffinate product from said rich adsorbent and, removing the said adsorbate from said rich adsorbent.

The preferred adsorbent comprises a crystalline aluminosilicate zeolite having a critical pore diameter greater than about 6A preferably 6.5 to 15A, and wherein the chemical formula of the zeolite can be expressed as $M_x(AlO_2)_x(SiO_2)_y(H_2O)_z$, where $x$, $y$ and $z$ are integers, the ratio $x{:}y$ being from 0.2 to 1.0 and where M represents sufficient cations (including H+) of metals, metal oxides or metal hydroxides to balance the electronegativity associated with the aluminosilicate framework of the zeolite. Preferably $z$ is greater than $2x$, typically $3$–$6x$.

In general, the sorbed ligand (e.g., water, $NH_3$ or mixtures thereof) will be present to the extent of 3–90% of zeolite capacity.

Separation of p-xylene from mixtures comprising $C_8$ aromatics, e.g., p-, m- and o-xylene and/or ethyl benzene can be achieved by using the present invention. Separation of 2,7-dimethylnaphthalene from 2,6-dimethylnaphthalene (and/or 1,5-dimethylnaphthalene) can also be done by the present invention.

BRIEF DESCRIPTION OF THE DRAWINGS

In the accompanying drawings, FIG. 1 illustrates how the degree of sorption of a zeolite can be controlled by controlling the desorption conditions, in this case the dehydroation temperature.

FIG. 2 illustrates the effect of degree of solvation on selectivity (i.e., separation factor) and capacity of the zeolite. Note that, in general, as the degree of solvation (e.g., weight percent adsorbed water) increases, the zeolite capacity tends to decrease. However, in the case of p-xylene adsorption on copper exchanged, Type Y zeolite (CuY), the selectivity for para-xylene increases with increased adsorbed water and reaches a maximum in the range of about 12–16 weight percent water. Note also that the capacity and selectivity curves cross at about 10 weight percent water and that in many instances such a cross-over point may be useful for balancing these two important variables.

FURTHER DESCRIPTION

The preferred molecular sieves have a framework with an Al/Si atomic ratio in the range of 0.65–0.35, typically 0.5, such as Type Y zeolite, particularly at a content of 1–18 weight percent of sorbed ligand (e.g., water, NH3 or mixtures thereof). In general, the content of sorbed ligand can be in the range of 3–90% of the zeolite capacity, with Y zeolites, typically, 5–75% of capacity.

Further preferred in this process is that the zeolite has been substantially fully solvated and then partially solvated by exposure to a temperature in the range of 50°–300°C (typically 70°–125°C) for sufficient time to produce the desired sorbent content. Such exposure can be at a reduced pressure and/or in the presence of the sorbent (e.g., water-saturated air or steam).

Also preferred is that from 25–100% of the electronegativity associated with the alumino-silicate framework of the zeolite is satisfied by cations of metals (especially copper and alkali metals, e.g., Na, K).

In general, in the present process selectivity can be improved by controlling the solvent content of the zeolite, as by the activation procedure (see the applications of Hedge and of Kirsch et al.) and/or by choice of type of sorbent and/or the types and relative amounts of metal cations and protons which are in exchange positions on the zeolite.

Among the preferred sorbents are ammonia, amines, alcohols and water. Mixtures of two or more such sorbents can also be used. For example, a zeolite containing both water and ammonia can be obtained by exposing the zeolite to water vapor (e.g., moist air) followed by exposure to gaseous ammonia or by exchange of a zeolite with an aqueous ammonium salt (e.g., $NH_4Cl$). In the case of sorbent in an exchange solution, metal cations can also be present.

Among the preferred cations are those of copper, nickel and the alkali metals (e.g., Na+, K+) and the rare earths (e.g., $Ce^{+3}$, $La^{+3}$). Partially cation deficient (e.g., protonated) zeolites are also preferred (e.g., CuHY or CuHNaY), which can be prepared, for example, by procedures in Ser. No. 211,040. For example, Table IV herein shows a $CuNH_4NaY$ zeolite. The ammonium cation can be decomposed, to produce CuNaY zeolite, by heating the zeolite (as in the dehydration procedure). Such decomposition or "activations" are described in the Kirsch et al. applications. If only partial desorption is done in such an activation, the resulting zeolite can be useful in the present process.

After this decomposition or desorption, the sorbent content of the zeolite can be further adjusted, as by controlled exposure to moist air or to gaseous ammonia.

Ser. No. 207,870 contains a typical plot of catalyst activation (e.g., dehydration) temperature (°C) versus time and shows that there can be temperature "plateaus" in such activations or desorptions). For example, the plot in Ser. No. 207,870 is for dehydration of a fully hydrated Type Y zeolite and shows that at atmospheric pressure there is one temperature plateau in the range of 100°–150°C (about 125°C) and a second plateau in the range of 225°–275°C (about 250°C). A preferred adsorbent for the present process is one which has been partially dehydrated at at least one such plateau and below 300°C. The pressure in the dehydration can be below atmospheric (e.g., vacuum pump).

The sorbent can also be introduced into the zeolite by use of a non-aqueous liquid, such as liquid ammonia, which can, if desired, also contain metal cations to be exchanged for cations in the zeolite. The term "sorption" as used herein includes all the sorptive phenomena described in the art, such as physical adsorption and chemical sorption and can involve van der W221's attraction, hydrogen bonding and even chemical reaction which causes the sorbent to be present in ionic or partially ionic form. With respect to the present invention, the major distinction of all such sorption is that the zeolite can be partially desorbed without destroying the zeolite framework (i.e., the zeolite retains at least 90% of the original crystallinity by X-ray).

Cyclic hydrocarbons which can be separated by the present process include those which can be separated by the processes of the previously cited applications of Hedge. The preferred separations are of cyclic aromatic compounds (which can be partially saturated, e.g., octahydrophenanthrene from octahydroanthracene). The solutions to be separated can be in liquid, vapor or mixed ligand-vapor phase. Preferably, the solution has low content (or is free from) compounds more highly branched than that desired to be separated. For example, if the desired separation is of a dimethylnaphthalene, the solution to be adsorbed should be as free of trimethylnaphthalene as is practical.

In general, the procedures described herein can be modified, by the man skilled in the refining art, to enable the separation of other cyclic hydrocarbons.

ILLUSTRATIVE EXAMPLES

Example 1

CuNay zeolite, obtained by exhaustive exchange of NaY zeolite with 5% $CuSO_4$ in water, was activated by heating in an oven, in flowing air at 95°C for 3 hours. The loss on ignition, LOI, at 800°C was 11.4 weight percent for the activated zeolite.

Four grams of activated zeolite were placed in a vertical steam-jacketed glass column, heated to 100°C, and a hot fluid mixture containing equimolar proportions of para and meta xylenes was percolated (drop wise) through the column (gravity flow) until the raffinate had the same composition as the feed. The adsorbate was then stripped from the zeolite with refluxing toluene and the product analyzed by vapor phase chromatography. Paraxylene was preferentially adsorbed with a separation factor of 1.5 (as reported in Table I for Run 559).

Example 2

Example 1 was repeated with CuNaY zeolite activated at a variety of conditions. Table I reports the results of these runs.

Example 3

Example 1 was repeated with a variety of activation conditions and four different zeolites, K-Bay, a barium exchanged potassium Y zeolite; AgNaY (a silver exchanged sodium Y zeolite); NaY zeolite; and NiNaY (a nickel-exchanged sodium Y zeolite). Table II reports the results of these runs and similar runs with CuNaY zeolite.

Example 4

Example 1 was repeated with the K-Bay zeolite and the CuNaY zeolite at a variety of activation temperatures, at two different separation temperatures (25° and 100°C) and with the feed in either liquid phase or in vapor phase in nitrogen gas as a carrier. The results are reported in Table III.

Typical analysis of preferred zeolites which can be used in the present process are reported in Tables IV and V hereof.

Example 5

This example shows that ammonia can also be used to improve the selectivity of mole sieve adsorbents. Samples of a variety of cation-exchanged, sodium-form zeolites (see Table V) were first dehydrated at 400°C (to a water content of 1.5 ±0.5 weight percent, by ignition analysis at 800°C) and then saturated with gaseous ammonia at 25°C. The sieves were then activated at different temperatures to produce adsorbents containing various amounts of adsorbed ammonia.

Comparisons of activation temperature vs. degree of ligand adsorption indicated that ammonia was adsorbed less strongly than water. For example, CuNaY zeolite activated at 100°C contained approximately 10 weight percent water compared to 4.6 weight percent ammonia—a difference of 50 mole percent. Even though less ammonia was adsorbed at any given temperature, it had a significant effect on selectivity. For example, the CuNaY zeolite containing 4.6 weight percent $NH_3$ preferentially adsorbed p-xylene ($\alpha = 1.6$) and exhibited high capacity (12.3 grams xylene per 100 grams sieve). Adsorbed ammonia also affected the selectivities of other cation-exchanged zeolites. The dehydrated K-Bay sieve appeared to be the best xylene adsorbent; however, ammonia adsorption reduced its selectivity. The results of these runs are reported in Table VI.

Example 6

Additional samples of CuNaY zeolites which had been activated at 400°C were either with eithr aqueous ammonia hydroxide or ammonia vapor plus water vapor at 25°C and reactivated at 100°C. In either case, p-xylene was selectively adsorbed ($\alpha = 1.6$ to 1.7) and the sieve capacity ranged from 9.3 to 11.0 gram per 100 grams sieve. The results showed no synergistic effect of ammonia plus water as ligands.

Example 7

Several other types of ligands were screened as potential moderators for xylene adsorptions. Samples of dry CuNaY zeolite were saturated with either liquid methanol, diethylamine vapor, or pyridine vapor at 25°C. Then each adsorbent was activated at various temperatures and tested for selectivity and xylene capacity. The results are summarized in Table VII.

Methanol only slightly improved the selectivity for p-xylene and, while the effect of adsorbed diethylamine was more significant, it was so strongly adsorbed on the zeolite that xylene capacity was reduced drastically. Pyridine was also strongly adsorbed, but in this case both xylene capacity and selectivity were poor.

Example 8

This example illustrates the manner in which the adsorbed ligand (e.g., $H_2O$, $NH_3$, etc.) can influence selectivity and capacity in the separation of alkyl polycyclic compounds (e.g., dimethylnaphthalene or "DMN's").

The feed stock consisted of 18 parts of a mixture of 38.5% 2,6-DMN and 61.5% 2,7-DMN dissolved in 90 parts by weight n-octane. After each run the adsorbent bed was carefully flushed with n-octane to remove unadsorbed DMN's prior to drying with a stream of nitrogen. Other than that, the process was the same as in Example 1 for liquid xylenes. The efficiency of CuNaY, CuNaX, and K-Bay zeolites were compared with that of NaY. Adsorbed water or ammonia greatly influenced selectivity.

These data, presented in Table VIII, show that 2,7-DMN is preferentially adsorbed and that separation factors can range from 1.0 to at least 4.2. The fact that NaY selectivities vary with degree of hydration had been previously reported by Dr. John A. Hedge (see U.S. Pat. No. 3,668,267).

The "fully" dehydrated K-Bay absorbent showed only slight selectivity for 2,7DMN ($\alpha = 1.2$) but the addition of 7.1% $H_2O$ boosted this separation factor to 2.2 with an accompanying 50% reduction in sieve capacity.

For these separations, the efficiency of CuNaY sieve was also very dependent on the amount of adsorbed water or ammonia. Separation factors in excess of 4.0 are possible with a CuNaY zeolite containing at least 6.5% $H_2O$ and adsorbed ammonia causes similar improvements in selectivity. For example, the zeolite can contain at least 6.5 weight percent water and upon ignition analysis at 800°C. evolves at least 0.5 weight percent ammonia.

Example 9

Another series of experiments where the feed contained all eight DMN isomers yielded simlar results (see Table IX). This feed was a sample of demethylator virgin feed (DVF) from the Toledo naphthalene plant of the Sun Oil Company and contains 75% DMN's. Several runs were made using CuNaY and NaY sieves. Again the presence of adsorbed water or ammonia markedly changed the selectivities of these zeolites.

The above examples show that the presence of adsorbed water or ammonia in zeolite molecular sieves has a significant effect on the selectivity of the zeolite as an adsorbent. In many instances the selectivity can be improved without significantly reducing the zeolite capacity. Other polar compounds which boil below about 400°C can also be used to alter selectivity and sensitivity of zeolite adsorbents. For example, HCl, HBr, HF, $HNO_3$, HCN, $SO_2$, $H_2S$, $SO_3$, $BF_3$, methylamine, formic acid, acetic acid, aldehydes, etc. can be so used.

In the present application, zeolites are frequently referred to by such nomenclature as CuNaY, which signifies a Type Y alumino-silicate zeolite which contains exchanged cations of sodium and copper. In general, in such zeolites the content of a given cation should be equivalent to at least 5% (with the polyvalent cations, typically at least 15%) of the exchange capacity of the zeolite. Such zeolites can also contain "protonated" or "decationized" sites.

In FIG. 1 herein, the water loss was 13.5% at 100°C, 21.1% at 200°C, 22.6% at 400°C and 23.6% at 800°C; therefore, it is usually preferred to desoluate at a temperature below about 400°C and usually below 200°C.

It is evident from the foregoing that the processes described herein can be used to separate a wide variety of structurally similar organic compounds, such as acyclic hydrocarbons, halogenated hydrocarbons, oxygenated hydrocarbons (e.g., alcohols, aldehydes, ketones, ethers, carboxylic acids, esters), nitrogen containing organics (e.g., amides, amines, heterocyclic rings), sulfur compounds, etc. That is, proper selection of the nature and quantity of a sorbed ligand (especially ammonia) can greatly improve the selectivity and/or capacity of a zeolite adsorbent for a given organic compound.

TABLE I

GuY Zeolite*
SEPARATION OF LIQUID m-XYLENE AND p-XYLENE AT 100°C

| Run No. | Activation Conditions | % Weight Loss on Ignition at 800°C | Xylene Capacity (g/100 g Sieve) | Separation Factor for p-xylene |
|---|---|---|---|---|
| 553-1 | $N_2$ flow at 500°C | 0.9 | 14.7 | 0.7 |
| 549 | $N_2$ flow at 400°C | 1.0 | 15.5 | 0.7 |
| 554-1 | $N_2$ flow at 200°C | 2.5 | 14.8 | 0.7 |
| 557-2 | Air flow at 200°C | — | — | 0.8 |
| 554-2 | $N_2$ flow at 110°C | 10.1 | 13.7 | 0.9 |
| 557-1 | Air flow at 110°C | 10.7 | 15.3 | 1.2 |
| 548 | Static air at 110°C | 10.4 | 10.7 | 1.4 |
| 554-3 | Static air at 110°C | 10.4 | 13.3 | 1.3 |
| 559 | Static air at 95°C | 11.4 | 10.7 | 1.5 |
| 561-2 | Static air at 82°C | 14.5 | 7.6 | 1.7 |
| 561-1 | Static air at 25°C | 23.6 | 9.2 | 1.1 |

*More precisely, CuNaY since the zeolite contained 1.5% $Na_2O$ and 13.2% CuO (fully hydrated basis).

TABLE II

Hydrated Type Y Zeolites
SEPARATION OF LIQUID p-XYLENE AND m-XYLENE AT 100°C

| Zeolite Type | Activation Conditions | % Weight Loss on Ignition at 800°C | Xylene Capacity (g/100 g Sieve) | Separation Factor ($\alpha p$) |
|---|---|---|---|---|
| K-Ba | $N_2$ flow at 400°C | | 13.6 | 3.8 |
| K-Ba | $N_2$ flow at 100°C | | 6.6 | 0.8 |
| CuNaY | $N_2$ flow at 400°C | 1.0 | 15.5 | 0.7 |
| CuNaY | Air flow at 100°C | 10.7 | 15.3 | 1.2 |
| CuNaY | Still air at 82°C | 14.5 | 7.6 | 1.7 |
| AgNaY | Air flow at 115°C | 3.7 | 14.4 | 1.3 |
| AgNaY | Still air at 80°C | 12.6 | 7.5 | 1.1 |
| NaY* | Air flow at 115°C | 13.4 | 13.5 | 1.2 |
| NaY | Still air at 81°C | 19.6 | 4.9 | 1.5 |
| NiNaY | Air flow at 115°C | 10.7 | 9.7 | 1.1 |
| NiNaY | Still air at 82°C | 16.3 | 6.1 | 1.2 |

*Typical analysis of NaY zeolite is 9.5% Na, 0.98 molar ratio $Na_2O/Al_2O_3$, 4.7 molar ratio $SiO_2/Al_2O_3$.

TABLE III

MOLE SIEVE SEPARATION OF m-XYLENE AND p-XYLENE

| Sieve | Run No. | Activation Temp (°C) | Separation Temp (°C) | Xylene Feed | Adsorbent Capacity (g/100 g Sieve) | Separation Factor ($\alpha$)* |
|---|---|---|---|---|---|---|
| K-Bay | 544 | 400 | 25 | Vapor in $N_2$ | 14.7 | $\alpha p = 1.3$ |
| K-Bay | 545 | 400 | 100 | i-$C_8$ solution | 14.7 | $\alpha p = 5.4$ |
| K-Bay | 543 | 110 | 25 | Vapor in $N_2$ | 5.3 | $\alpha m = 1.4$ |
| K-Bay | 546 | 400 | 100 | Liquid | 13.6 | $\alpha p = 3.80$ |
| CuNaY | 540 | 110 | 25 | Vapor in $N_2$ | 10.5 | $\alpha p = 1.75$ |
| CuNaY | 548 | 110 | 100 | Liquid | 10.7 | $\alpha p = 1.4$ |
| CuNaY | 549 | 400 | 100 | liquid | 15.5 | $\alpha m = 1.4$ |
| K-Bay | 547 | 110 | 100 | Liquid | 6.6 | $\alpha m = 1.2$ |

*$\alpha p$ = separation factor for p-xylene; $\alpha m$ = separation factor for m-xylene

TABLE IV

Typical Zeolite Analyses
(Weight Percentages)

| Zeolite | NiO | % CuO | $Na_2O$ | $Al_2O_3$ | $(NH_4)_2O$ | $SiO_2$ | LOI |
|---|---|---|---|---|---|---|---|
| $NiNaNH_4Y$ | 5.31 | — | 1.10 | 16.29 | 3.70 | 49.17 | 26.66 |
| $CuNaNH_4Y$ | — | 5.56 | 1.05 | 14.69* | 3.89 | 48.64 | 26.17 |
| NiNaY | 8.59 | — | 2.09 | 15.39 | — | 45.91 | 26.42 |
| CuNaY | — | 13.16 | 1.50 | 16.12* | — | 43.82 | 25.40 |

*By difference
LOI = loss on ignition at 1900°F.

TABLE V

Typical Metal Exchanged Sodium Zeolites

| Final Zeolite | Wt.% Exchanged* Cation |
|---|---|
| CuNaY | 15.0 Cu |
| CuNaX | 13.0 Cu |
| NiNaY | 4.4 Ni |
| AgNaY | 11.4 Ag |
| CoNaY | 4.6 Co |

*Fully Hydrated Basis

TABLE VIII

ZEOLITE FRACTIONATION OF 2,6- AND 2,7-DMN

| Run No. | Zeolite Type | Ligand Concentration (Wt.%) | DMN Capacity (gm/100 gm sieve) | Separation Factor ($\alpha_{2,7}$) |
|---|---|---|---|---|
| 610-2 | CuNaY | 1.0 H$_2$O | 13.9 | 1.1 |
| 612-2 | " | 8.5 H$_2$O | 13.7 | 2.1 |
| 610-1 | " | 12.7 H$_2$O | — | 2.6 |
| 612-1 | " | 14.9 H$_2$O | 6.5 | 4.2 |
| 614-2 | " | 4.5 NH$_3$ + 1.0 H$_2$O | 12.3 | 1.3 |
| 620-1 | " | 8.2 NH$_3$ + 1.0 H$_2$O | 15.0 | 2.1 |
| 614-1 | " | 11.5 NH$_3$ + 1.0 H$_2$O | 10.3 | 2.9 |
| 619-2 | CuNaX | 1.5 H$_2$O | 9.2 | 1.0 |
| 618-2 | " | 14.4 H$_2$O | 4.8 | 1.4 |
| 620-2 | " | 5.3 NH$_3$ + 1.5 H$_2$O | 9.8 | 1.7 |
| 613-1 | NaY | 1.5 H$_2$O | 22.1 | 1.6 |
| 613-2 | " | 17.8 H$_2$O | 3.0 | 15.0 |
| 621-2 | " | 4.0 + 1.5 H$_2$O | 23.8 | 1.9 |
| 625-1 | KBaY | 1.5 H$_2$O | 14.1 | 1.2 |
| 625-2 | " | 5.5 NH$_3$ + 1.5 H$_2$O | 12.1 | 1.4 |
| 626-1 | " | 13.7 H$_2$O | 2.6 | 1.3 |

Feed: 10 wt. % solution (in n-octane) of a eutectic mixture of 38.5% 2,6-DMN and 61.5% 2,7-DMN

TABLE VI

XYLENE FRACTIONATION WITH SUBSTANTIALLY ANHYDROUS ZEOLITES CONTAINING ADSORBED AMMONIA

| Run No. | Zeolite Type | Activation Temp., °C* | Adsorbed NH$_3$ (Wt.%) | Total NH$_3$+H$_2$O (Wt/%)** | Xylene Capacity (g/100 g sieve) | Separation Factor ($\alpha p$) |
|---|---|---|---|---|---|---|
| 579-2 | NaY | 110 | 2.7 | 4.2 | 18.5 | 0.7 |
| 607-1 | NaY | 450 | 0.0 | 1.5 | 20.8 | 0.5 |
| 588-2 | CuNaY | 100 | 4.6 | 5.6 | 12.3 | 1.6 |
| 595-1 | CuNaY | 80 | 7.6 | 8.6 | 13.0 | 1.4 |
| 595-2 | CuNaY | 130 | 3.7 | 4.7 | 14.5 | 1.2 |
| 549 | CuNaY | 400 | 0.0 | 1.0 | 15.5 | 0.7 |
| 591-2 | NiNaY | 25 | 8.9 | 10.4 | 11.3 | 1.5 |
| 607-2 | NiNaY | 450 | 0.0 | 1.5 | 16.8 | 0.5 |
| 592-1 | CoNaY | 25 | 11.7 | 13.2 | 11.4 | 1.5 |
| 607-3 | CoNaY | 450 | 0.0 | 1.5 | 16.8 | 0.5 |
| 621-1 | CuNaX | 70 | 5.9 | 7.4 | 5.9 | 1.1 |
| 619-1 | CuNaX | 450 | 0.0 | 1.5 | 10.1 | 1.3 |
| 596 | KBay | 100 | 3.1 | 4.6 | 12.6 | 2.9 |
| 546 | KBay | 400 | 0.0 | 1.5 | 13.6 | 3.8 |

*Tube furnace — N$_2$ flow
**On ignition analysis at 800°F (±0.5 wt.%), that is, the zeolite after the 400°C activation had a loss on ignition of the indicated amount of water.

TABLE VII

FRACTIONATION OF LIQUID XYLENES WITH CuNaY·L ZEOLITES

| Run No. | Activation Temp., °C. | Ligand (L) (Wt.%)* | Xylene Capacity (gm/100 gm sieve) | Separation Factor |
|---|---|---|---|---|
| 549 | 400 | 1.0 H$_2$O | 15.5 | 0.7 |
| 561-2 | 82 | 14.5 H$_2$O | 7.6 | 1.7 |
| 588-2 | 100 | 4.6 NH$_3$ + 1.0 H$_2$O | 12.3 | 1.6 |
| 630-1 | 70 | 11.7 MeOH + 1.0 H$_2$O | 10.2 | 1.2 |
| 630-2 | 130 | 6.1 MeOH + 1.0 H$_2$O | 16.0 | 1.1 |
| 629-1 | 70 | 16.6 Et$_2$NH + 1.0 H$_2$O | 2.0 | 2.1 |
| 629-2 | 130 | 15.7 Et$_2$NH + 1.0 H$_2$O | 4.0 | 1.8 |
| 601-2 | 100 | 16.7 Pyridine + 1.0 H$_2$O | <1.0 | — |
| 604-1 | 250 | 10.2 Pyridine + 1.0 H$_2$O | 5.6 | 0.8 |
| 604-2 | 300 | 9.5 Pyridine + 1.0 H$_2$O | 7.0 | 1.0 |

*On ignition at 800°C.

TABLE IX

ZEOLITE FRACTIONATION OF DMN CONCENTRATE (DVF)

| Run No. | Zeolite Type | Ligand Concentration (Wt.%) | (g/100 g sieve) | Separation Factor ($\alpha_{2,7/2,6}$) |
|---|---|---|---|---|
| 622-2 | NaCuY | 1.0 $H_2O$ | 23.5 | 1.1 |
| 617-1 | NaCuY | 15.3 $H_2O$ | 12.3 | 1.8 |
| 623-1 | NaCuY | 8.5 $NH_3$ + 1.0 $H_2O$ | 14.8 | 1.7 |
| 622-1 | NaY | 1.5 $H_2O$ | 23.5 | 1.1 |
| 616-1 | NaY | 14.0 | 17.0 | 1.8 |
| 623-2 | NaY | 5.1 $NH_3$ + 1.5 $H_2O$ | 16.2 | 4.5 |

*"DVF" signifies "dimethylator virgin feed", which is an alkyl-naphthalene stream from the Sun Oil Company's Toledo naphthalene plant and which contains 75% dimethylnaphthalenes (DMNs)

$$**\alpha_{2,7/2,6} = \frac{\text{Ratio 2,7-DmN/2,6-DMN adsorbed}}{\text{Ratio 2,7-DMN/2,6-DMN in feed}}$$

(exclusive of all other DVF components)

TABLE X

CuNaY ZEOLITE - LIQUID XYLENE SEPARATIONS AT 100°C.

| Run No. | Temperature (°C) | Degree of Hydration (Wt. % $H_2O$) | Xylene Capacity (gm/100 gm sieve) | Separation Factor ($\alpha p$) |
|---|---|---|---|---|
| 549 | 400 $N_2$ | 1.0 | 15.5 | 0.7 |
| 554-1 | 200 | 2.5 | 14.8 | 0.7 |
| 554-2 | 110 | 10.4 | 13.7 | 0.9 |
| 557-1 | 110 | 10.7 | 15.3 | 1.2 |
| 548 | 110 air | 12.5 | 10.7 | 1.4 |
| 559 | 95 | 11.4 | 10.7 | 1.5 |
| 561-2 | 82 | 14.5 | 7.6 | 1.7 |
| 561-1 | 25 | 23.6 | 9.2 | 1.1 |

*On ignition at 800°C.
**"$N_2$" is for activation in flowing nitrogen; "air" signifies activation in static air

TABLE XI

CATION EXCHANGED ZEOLITES LIQUID XYLENE FRACTIONATION AT 100°C

| Run No. | Zeolite Type | Activation Temp (°C) | Degree of Hydration (Wt. % $H_2O$)* | Xylene Capacity (gm/100 gm sieve) | Separation Factor ($\alpha p$) |
|---|---|---|---|---|---|
| 546 | K-BaY | 400 | 1.5 | 13.6 | 3.8 |
| 547 | K-BaY | 100 | 12.4 | 6.6 | 0.8 |
| 549 | **CuY | 400 | 1.0 | 15.5 | 0.7 |
| 557-1 | **CuY | 110 | 10.7 | 15.3 | 1.2 |
| 561-2 | **CuY | 82 | 14.6 | 7.6 | 1.7 |
| 562 | **AgY | 115 | — | 14.4 | 1.3 |
| 566 | **AgY | 80 | — | 7.5 | 1.1 |
| 565-1 | NaY | 115 | 13.4 | 13.5 | 1.2 |
| 565-2 | NaY | 81 | 19.6 | 4.9 | 1.5 |
| 564-1 | **NiY | 115 | 10.7 | 9.7 | 1.1 |
| 564-2 | **NiY | 82 | 16.3 | 6.1 | 1.2 |
| 619-1 | **CuX | 450 | 1.5 | 10.1 | 1.3 |
| 618-1 | **CuX | 87 | 14.5 | 5.5 | 1.1 |

*on ignition analysis at 800°F (±0.5 weight percent)
**more precisely, CuNaY, since this and the following polyvalent metal-containing zeolites were made by exchange of sodium Y zeolite.

The invention claimed is:

1. Process for separating structurally similar cyclic hydrocarbons, said process comprising:

A. contacting a fluid feed mixture comprising said cyclic hydrocarbons with a solid adsorbent comprising a partially-solvated, substantially crystalline metallic alumino-silicate zeolite, the solvate consisting essentially of ammonia or of ammonia and water, said zeolite having a critical pore diameter greater than about 6A, the ratio Al/Si of the alumino-silicate framework of the zeolite being in the range of 1.0–0.1, whereby there is obtained a rich adsorbent containing an adsorbate which is richer in one said cyclic hydrocarbon than was said fluid feed mixture, and a raffinate product which contains less of the one said cyclic hydrocarbon than did said fluid feed mixture, B. separating said raffinate product from said rich adsorbent and, C. removing the one said cyclic hydrocarbon from said rich adsorbent, and wherein said partially-solvated zeolite upon ignition analysis at 800°C evolves at least 0.5 weight percent ammonia and wherein from 25–100% of the electronegativity associated with the zeolite framework is satisfied by cations of metals.

2. Process according to claim 1 wherein said cations of metals comprise one or more of the rare earths, lanthanum, copper, silver, lithium, sodium, potassium, calcium, magnesium, barium or mixtures of two or more of said cations.

3. Process according to claim 1 wherein said ratio Al/Si is in the range of 0.65–0.2.

4. Process according to claim 1 wherein said structurally similar cyclic hydrocarbons are selected from (i) two or more xylenes or (ii) two or more dimethylnaphthalenes.

5. Process according to claim 1 wherein upon ignition analysis at 800°C said zeolite also evolves at least 0.5 weight percent water.

6. Process according to claim 3 wherein upon ignition analysis at 800°C said zeolite evolves in the range of 1.0–10% ammonia.

7. Process according to claim 6 wherein from 25–100% of the electronegativity associated with the alumino-silicate framework of said zeolite is satisfied by cations of sodium, potassium, barium, copper, silver, or mixtures of two or more of said cations.

8. Process according to claim 1 wherein said structurally similar cyclic hydrocarbons comprise p-xylene and m-xylene.

9. Process according to claim 1 wherein said structurally similar cyclic hydrocarbons comprise 2,6-dimethylnaphthalene and 2,7-dimethylnaphthalene.

10. Process according to claim 1 wherein said structurally similar cyclic hydrocarbons comprise 2,6-dimethylnaphthalene and 1,5-dimethylnaphthalene.

11. Process according to claim 1 wherein said feed mixture contains dimethylnaphthalenes said zeolite is CuNaY having a ratio Al/Si in the range of 0.2–0.65 and containing at least 6.5 weight percent water, the water and ammonia contents being selected to cause the separation factor for the one said cyclic compound to be at least 4.0.

12. The process of claim 1 wherein the content of the sorbed solvate is in the range of 3–90% of the zeolite capacity.

* * * * *